United States Patent
Tyler

(10) Patent No.: US 10,870,233 B2
(45) Date of Patent: Dec. 22, 2020

(54) ADDITIVE MANUFACTURING SYSTEM HAVING FEED-TENSIONER

(71) Applicant: CC3D LLC, Coeur d'Alene, ID (US)

(72) Inventor: Kenneth L. Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 479 days.

(21) Appl. No.: 15/730,777

(22) Filed: Oct. 12, 2017

(65) Prior Publication Data

US 2018/0126648 A1    May 10, 2018

Related U.S. Application Data

(60) Provisional application No. 62/417,709, filed on Nov. 4, 2016.

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ....... B33Y 40/00; B33Y 30/00; B29C 64/307; B29C 31/042; B29C 64/118; B29C 64/386; B29C 64/209
See application file for complete search history.

(56) References Cited

U.S. PATENT DOCUMENTS 3,249,315 A    5/1966   Peltier
3,286,305 A    11/1966  Seckel
(Continued)

FOREIGN PATENT DOCUMENTS

DE    4102257 A1    7/1992
EP    2589481       1/2016
(Continued)

OTHER PUBLICATIONS

International Search Report dated Feb. 13, 2018 for PCT/US17/59669 to CC3D LLC Filed Nov. 2, 2017.
(Continued)

*Primary Examiner* — Jacob T Minskey
*Assistant Examiner* — Adrien J Bernard
(74) *Attorney, Agent, or Firm* — Ryan C. Stockett

(57) ABSTRACT

A tension mechanism is disclosed for use with a print head of an additive manufacturing system. The tension mechanism may include a first guide roller configured to receive a continuous reinforcement making up a portion of a composite structure. The tension mechanism may also include a second guide roller spaced apart from the first guide roller and configured to receive the continuous reinforcement in a straight-line trajectory from the first guide roller. The tension mechanism may further include a dancer located between the first and second guide rollers and configured to bias the continuous reinforcement away from the straight-line trajectory. At least one of the first and second guide rollers may have a concave outer profile configured to axially spread out the continuous reinforcement.

20 Claims, 4 Drawing Sheets

(51) Int. Cl.

| | | |
|---|---|---|
| *B33Y 50/02* | (2015.01) | |
| *B33Y 40/00* | (2020.01) | |
| *B29C 64/118* | (2017.01) | |
| *B29C 64/386* | (2017.01) | |
| *B29C 64/20* | (2017.01) | |
| *B29C 64/393* | (2017.01) | |
| *B29C 64/106* | (2017.01) | |
| *B29C 70/38* | (2006.01) | |
| *B29C 64/291* | (2017.01) | |
| *B29C 64/245* | (2017.01) | |
| *B29C 64/141* | (2017.01) | |
| *B29C 64/264* | (2017.01) | |
| *B29C 64/307* | (2017.01) | |
| *B29C 64/379* | (2017.01) | |
| *B29C 64/336* | (2017.01) | |
| *B29C 64/165* | (2017.01) | |
| *B29C 64/227* | (2017.01) | |
| *B29C 64/40* | (2017.01) | |
| *B33Y 10/00* | (2015.01) | |
| *B29C 35/08* | (2006.01) | |
| *B29C 35/02* | (2006.01) | |
| *B29K 105/08* | (2006.01) | |
| *B29B 15/12* | (2006.01) | |
| *B29C 70/52* | (2006.01) | |
| *B29C 31/04* | (2006.01) | |
| *B29C 64/259* | (2017.01) | |
| *B33Y 70/00* | (2020.01) | |
| *B29C 64/295* | (2017.01) | |

(52) U.S. Cl.
CPC .......... *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08); *B29C 64/307* (2017.08); *B29C 64/336* (2017.08); *B29C 64/379* (2017.08); *B29C 64/386* (2017.08); *B29C 64/393* (2017.08); *B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); *B29C 31/042* (2013.01); *B29C 35/0261* (2013.01); *B29C 64/259* (2017.08); *B29C 64/295* (2017.08); *B29C 70/524* (2013.01); *B29C 2035/0827* (2013.01); *B29C 2035/0855* (2013.01); *B29K 2105/08* (2013.01); *B33Y 10/00* (2014.12); *B33Y 70/00* (2014.12)

(56) References Cited

U.S. PATENT DOCUMENTS

| | | |
|---|---|---|
| 3,809,514 A | 5/1974 | Nunez |
| 3,874,030 A | 4/1975 | Knight |
| 3,921,876 A | 11/1975 | Corse |
| 3,984,271 A | 10/1976 | Gilbu |
| 3,993,726 A | 11/1976 | Moyer |
| 4,151,594 A | 4/1979 | Stern |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0044593 A1* | 3/2003 | Vaidyanathan ....... B29B 15/122 428/297.4 |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0238612 A1 | 8/2014 | Vaniglia et al. |
| 2014/0268604 A1 | 9/2014 | Wicker et al. |
| 2014/0291886 A1 | 10/2014 | Mark et al. |
| 2015/0108677 A1* | 4/2015 | Mark .................... B29C 64/209 264/138 |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |

(56) References Cited

U.S. PATENT DOCUMENTS

| | | |
|---|---|---|
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | | |
|---|---|---|---|
| EP | 3219474 A1 | 9/2017 | |
| KR | 100995983 B1 | 11/2010 | |
| KR | 101172859 B1 | 8/2012 | |
| WO | 2013017284 A2 | 2/2013 | |
| WO | 2016088042 A1 | 6/2016 | |
| WO | 2016088048 A1 | 6/2016 | |
| WO | WO-2016088049 A1 * | 6/2016 | ............ B33Y 30/00 |
| WO | 2016110444 A1 | 7/2016 | |
| WO | 2016159259 A1 | 10/2016 | |
| WO | 2016196382 A1 | 12/2016 | |
| WO | 2017006178 A1 | 1/2017 | |
| WO | 2017006324 A1 | 1/2017 | |
| WO | 2017051202 A1 | 3/2017 | |
| WO | 2017081253 A1 | 5/2017 | |
| WO | 2017085649 A1 | 5/2017 | |
| WO | 2017087663 A1 | 5/2017 | |
| WO | 2017108758 A1 | 6/2017 | |
| WO | 2017122941 A1 | 7/2017 | |
| WO | 2017122942 A1 | 7/2017 | |
| WO | 2017122943 A1 | 7/2017 | |
| WO | 2017123726 A1 | 7/2017 | |
| WO | 2017124085 A1 | 7/2017 | |
| WO | 2017126476 A1 | 7/2017 | |
| WO | 2017126477 A1 | 7/2017 | |
| WO | 2017137851 A2 | 8/2017 | |
| WO | 2017142867 A1 | 8/2017 | |
| WO | 2017150186 A1 | 9/2017 | |

OTHER PUBLICATIONS

Website-Markforged Installing Fiber Spool Tensioner.
A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

(56) References Cited

OTHER PUBLICATIONS

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and Uv Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

ADDITIVE MANUFACTURING SYSTEM HAVING FEED-TENSIONER

RELATED APPLICATIONS

This application is based on and claims the benefit of priority from U.S. Provisional Application No. 62/417,709 that was filed on Nov. 4, 2016, the contents of which are expressly incorporated herein by reference.

TECHNICAL FIELD

The present disclosure relates generally to a manufacturing system and, more particularly, to an additive manufacturing system having a feed tensioner.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, during conventional fiber pultrusion, ensuring adequate feed rates of and/or tension within the fibers can be problematic.

The disclosed system is directed to addressing one or more of the problems set forth above and/or other problems of the prior art.

SUMMARY

In one aspect, the present disclosure is directed to a tension mechanism for a print head of an additive manufacturing system. The tension mechanism may include a first guide roller configured to receive a continuous reinforcement making up a portion of a composite structure. The tension mechanism may also include a second guide roller spaced apart from the first guide roller and configured to receive the continuous reinforcement in a straight-line trajectory from the first guide roller. The tension mechanism may further include a dancer located between the first and second guide rollers and configured to bias the continuous reinforcement away from the straight-line trajectory. At least one of the first and second guide rollers may have a concave outer profile configured to axially spread out the continuous reinforcement.

In another aspect, the present disclosure is directed to a head for an additive manufacturing system. The head may include a matrix reservoir, and a nozzle connected to receive a continuous reinforcement via the matrix reservoir. The head may also include a tension mechanism configured to maintain a desired tension level within the continuous reinforcement.

In yet another aspect, the present disclosure is directed to a head assembly for an additive manufacturing system. The head assembly may include a mounting bracket having a first end connectable to a moveable support, and a second end. The head assembly may also include a print head connected to the second end of the mounting bracket and configured to discharge a matrix-coated reinforcement, and a tension mechanism connected to the mounting bracket between the first and second ends and configured to generate a desired level of tension within the matrix-coated reinforcement.

In still another aspect, the present disclosure is directed to an additive manufacturing system. The additive manufacturing system may include a moveable support, and a mounting bracket having a first end connectable to the moveable support, and a second end. The additive manufacturing system may also include a print head connected to the second end of the mounting bracket and configured to discharge a matrix-coated reinforcement, a feeder configured to feed reinforcement to the print head, and a tension mechanism connected to the mounting bracket and configured to generate a desired level of tension within the reinforcement prior to matrix-coating of the reinforcement. The additive manufacturing system may further include a controller in communication with the moveable support, the tension mechanism, and the feeder. The controller may be configured to selectively activate the moveable support and the feeder based on structural specifications and signals from the tension mechanism.

DETAILED DESCRIPTION

Figure 1:
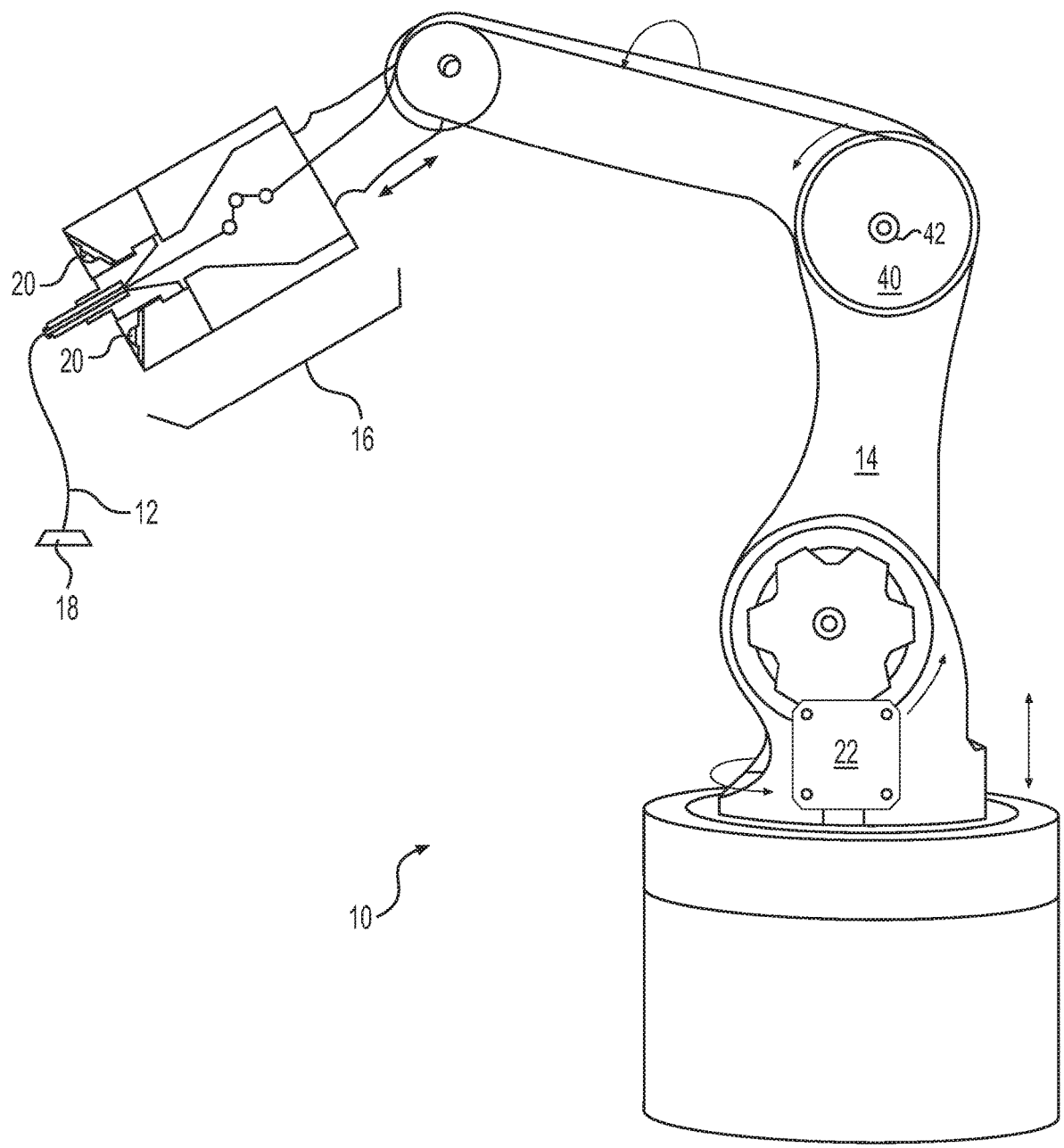
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16 (e.g., as a pre-preg material), and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed and/or tension mechanisms), if desired. However, the discharge rate of the reinforcement from head 16 may primarily be the result of relative movement between head 16 and anchor point 18, such that a desired level of tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, configuration, and/or feed-rate of reinforcement and/or matrix to be discharged at a particular location within structure 12, and/or an amount, intensity, shape, and/or location of desired compacting and curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
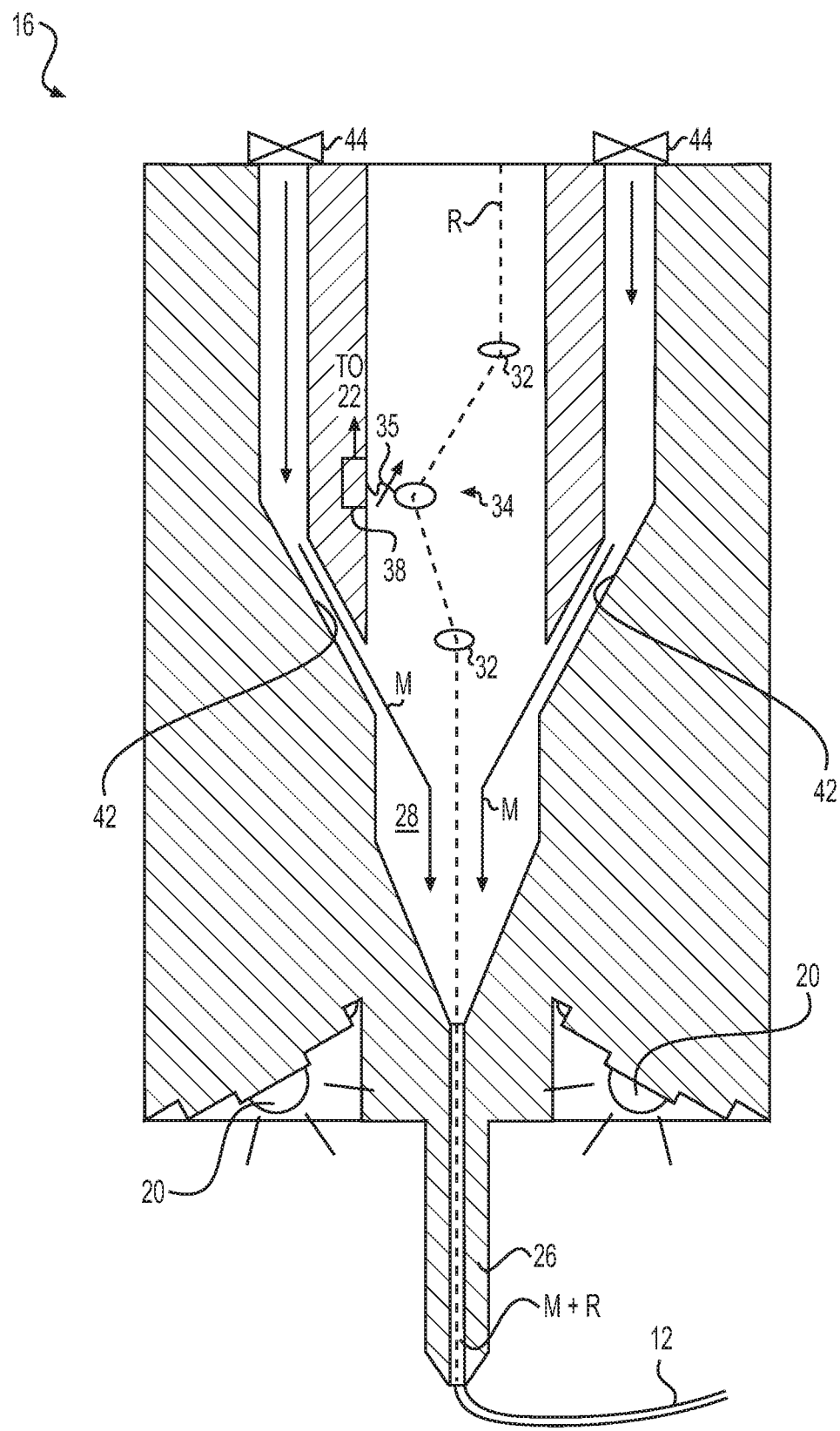
FIGS. 2 and 5 are diagrammatic illustrations of exemplary disclosed heads that may be utilized with the manufacturing system of FIG. 1.

An exemplary head 16 is disclosed in detail in FIG. 2. Head 16 may have a nozzle 26, through which matrix-wetted reinforcements are discharged. In one example, nozzle 26 is located at a lower end of a matrix reservoir 28, and at least partially surrounded by cure enhancers 20. The reinforcements may be received at an opposing upper end of reservoir 28, pass axially through reservoir 28 where at least some matrix-impregnation occurs, and be discharged from head 16 via nozzle 26.

Care should be taken to ensure that reinforcements are fed into matrix reservoir 28 at about the same rate that the reinforcements are discharging from nozzle 26. A feed rate of reinforcements that is too high could result in bunching of reinforcements within matrix reservoir 28 and too low of a tension level in the cured reinforcements. And too low of a tension level could allow portions of structure 12 to sag undesirably. A feed rate of reinforcements that is too low could result in too high of a tension level in the cured reinforcements. And too high of a tension level could weaken structure 12 and/or cause portions of structure 12 to deviate from desired placement locations. For these reasons, a tension mechanism 30 may be associated with head 16 and configured to regulate a level of tension within the reinforcements passing through head 16.

In the embodiment of FIG. 2, tension mechanism 30 is located at least partially (e.g., completely) inside of head 16. For example, tension mechanism 30 may be located inside or upstream of matrix reservoir 28. Tension mechanism 30 may include, among other things, one or more (e.g., two) idler or guide elements 32, and a dancer 34 located between guide elements 32. Guide elements 32 may be, for example, rollers, eyelets, fingers, lever arms, or other similar devices that are stationary and configured to guide reinforcements (represented as R in FIG. 2) into general alignment (e.g., parallel or concentric alignment) with a center axis of head 16. Dancer 34 may be a roller, eyelet, finger, lever arm, or other similar device that is moveable and biased (e.g., via a spring 35) to urge (e.g., to push or to pull) reinforcements R radially away from a straight-line trajectory between guide elements 32. It is contemplated that the bias of dancer 34 may be selectively tuned, if desired, to adjust a movement amount of reinforcements R for a given level of tension.

As the tension within reinforcements R increases, dancer 34 may be pulled more into alignment with the straight-line trajectory between guide elements 32. In contrast, as the tension within reinforcements R decreases, dancer 34 may pull reinforcements R further out of alignment. In this manner, at least a minimum level of tension may be provided within reinforcements R, such that bunching of reinforcements R within matrix reservoir 28 is inhibited.

In some embodiments, a sensor 38 may be associated with tension mechanism 30 and used to regulate operation of a feeder 40 (shown only in FIG. 1). In these embodiments, as dancer 34 is pulled further into axial alignment with the straight-line trajectory between guide elements 32, a signal (e.g., an on/off or proportional signal) may be generated indicative of the movement. This signal may be directed to controller 22 (referring to FIG. 1), and controller 22 may be programmed to responsively cause feeder 40 to increase a feed rate of reinforcements R into matrix reservoir 28. This increased feed rate may help to reduce the tension within reinforcements R, allowing dancer 34 to return to a more misaligned position. Sensor 38 may then generate a corresponding signal (e.g., a reduced signal or a lack of signal) causing controller 22 to reduce the feed rate of reinforcements R (e.g., via slowing or stopping of feeder 40). Feeder 40 may be, for example, a motorized supply spool of reinforcements R that is selectively energized to dispense an amount or a rate of reinforcements R. In some embodiments, feeder 40 may itself include a tensioner (e.g., a fixed or adjustable tensioner) 42 that inhibits free-spooling.

It is contemplated that a flow of matrix (represented as M in FIG. 2) into head 16 could be used to affect the movement of reinforcements R through head 16, if desired. For example, one or more (e.g., two) matrix jets 42 may be positioned to supply matrix M into matrix reservoir 28 in such a way that the supply encourages movement of reinforcements R into and/or through nozzle 26. For instance, matrix jets 42 could be oriented to spray the matrix M towards and/or into nozzle 26 from opposing radial sides of reinforcements R. In this embodiment, the flow(s) (e.g., rate, pressure, and/or volume) of matrix could be selectively regulated by controller 22 (e.g., via one or more valves 44) in response to the signals generated by sensor 38 and/or commands directed to feeder 40, such that a desired ratio of matrix-to-reinforcement is maintained regardless of the feed rate of the reinforcements R. Likewise, the flow(s) of matrix could be selectively regulated by controller 22 in response to the signals generated by sensor 38 to affect a feed and/or discharge rate of reinforcements R from nozzle 26.

Figure 3:
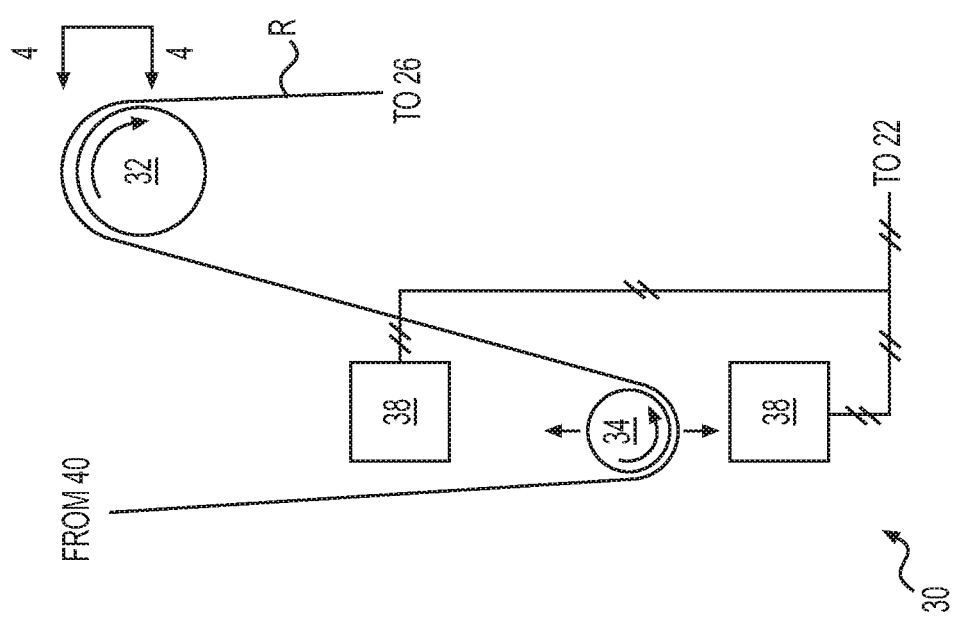

FIG. 3 illustrates an alternative embodiment of tension mechanism 30. Like the embodiment of FIG. 2, tension mechanism 30 of FIG. 3 includes at least one stationary guide element 32, and a dancer 34 that moves in response to a parameter of reinforcements R. It is contemplated that tension mechanism 30 of FIG. 3 may be located inside of head 16 (e.g., within matrix reservoir 28) or outside of head 16. In this embodiment, dancer 34 is biased by way of gravity instead of or in addition to a spring element. It is contemplated, however, that dancer 34 of FIG. 3 could be biased solely by way of a spring element, if desired. As an amount of available reinforcements R decreases (e.g., when the feed rate is lower than the consumption rate), dancer 34 may be pulled upward such that reinforcements R have a more straight-line trajectory. In contrast, as the amount of available reinforcements R increases (e.g., when the feed rate is higher than the consumption rate), the weight of dancer 34 may cause dancer 34 to pull reinforcements R downward away from the straight-line trajectory. Throughout this operation, a relatively constant tension level (e.g., within engineering tolerances) related to a weight of dancer 34 resting on the reinforcements R may be generated.

In some embodiments, one or more (e.g., two) sensors 38 may be associated with the dancer 34 of FIG. 3 and used to control the feed rate of reinforcements R. For example, a first sensor 38 may be located at an upper limit of dancer 34, while a second sensor 38 may be located at a lower limit of dancer 34. In this configuration, as dancer 34 approaches, aligns with, or passes by the first sensor 38 (e.g., when an amount of available reinforcements R reaches a minimum limit), the first sensor 38 may detect dancer 34 (e.g., detect crossing of an optical path, passage through a magnetic field, engagement with a contact, etc.) and generate a corresponding signal causing controller 22 (referring to FIG. 1) to activate feeder 40 and increase the feed rate of reinforcements R into head 16. In contrast, as dancer 34 approaches, aligns with, or passes by the second sensor 38 (e.g., when the amount of available reinforcements R reaches a maximum limit), the second sensor 38 may generate a corresponding signal causing controller 22 (referring to FIG. 1) to decrease the feed rate of reinforcements R into head 16.

Figure 4:
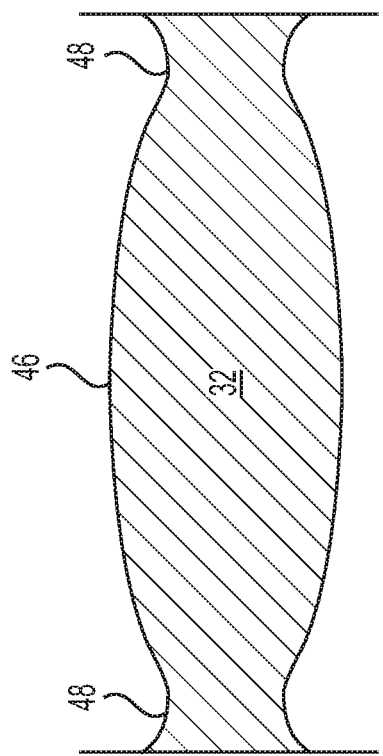
FIGS. 3 and 4 are diagrammatic illustrations of an exemplary disclosed feed-tensioner that may be used in conjunction with the heads of FIGS. 2 and 5.

FIG. 4 illustrates an exemplary disclosed guide element 32 that may be used within the tension mechanism embodiments of FIGS. 2 and/or 3. As shown in FIG. 4, the cross-section of guide element 32 may have a generally convex outer profile 46 over which reinforcements R pass. This profile may cause reinforcements R to spread out in an axial direction of guide element 32, allowing for greater impregnation of reinforcements R with matrix M during passage through matrix reservoir 28 (referring to FIG. 2). It is contemplated that the convex outer profile may continue completely to opposing axial ends 48 of guide element 32 or that axial ends 48 may be filleted to avoid snagging of the reinforcements R at the interior corner locations.

Figure 5:
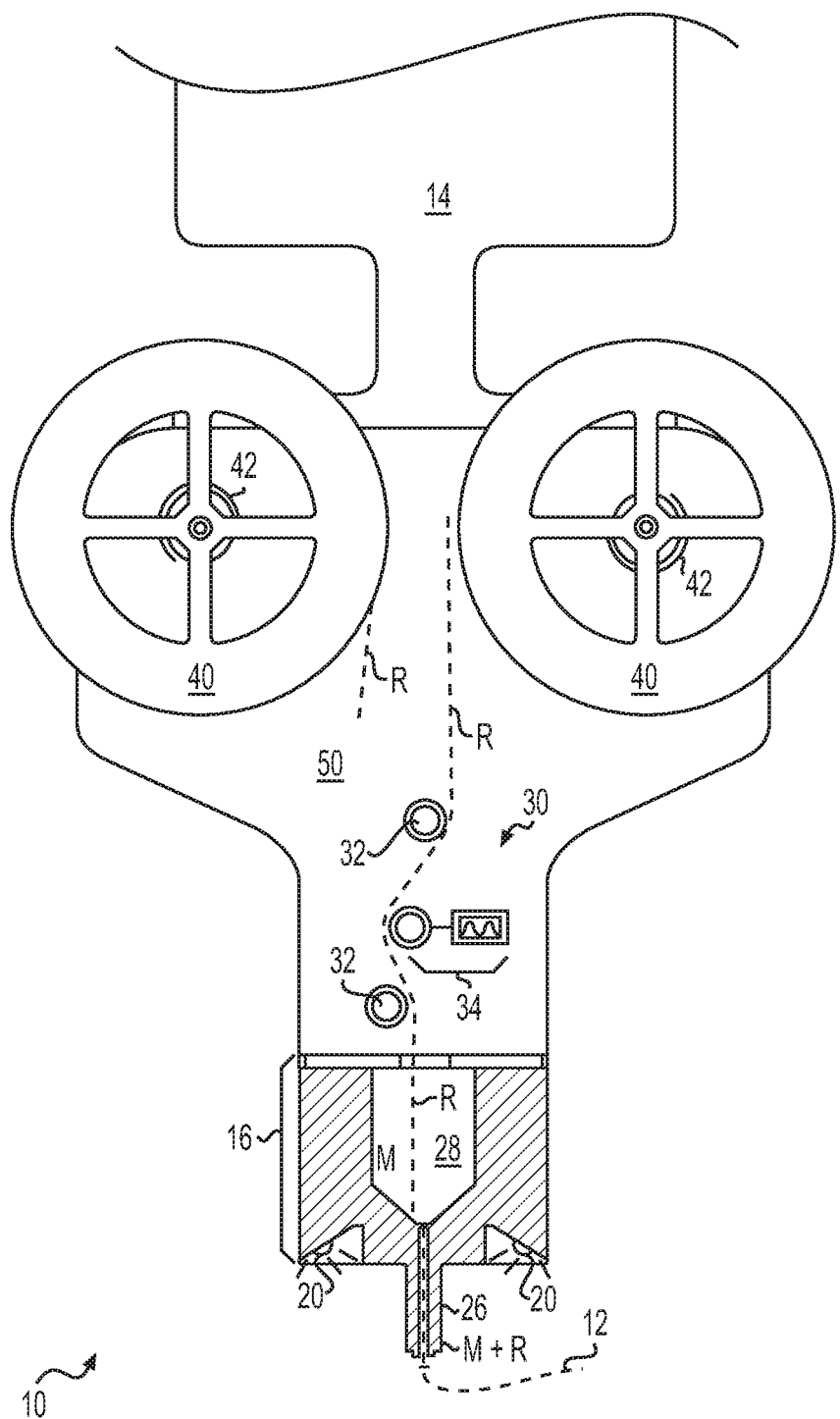

FIG. 5 illustrates system 10 as having an external tension mechanism 30 that is connected to a mounting bracket 50 at a location upstream of head 16. Mounting bracket 50 may include a first end configured to engage a distal tip of support 14, and an opposing second end that receives head 16. Tension mechanism 30 may be connected to a face of mounting bracket 50, between the first and second ends of mounting bracket 50. Any number of feeders 40 (e.g., two or more feeders 40) may be connected to same face of mounting bracket 50 as tension mechanism 30, and configured to feed reinforcements R through the same or different tensioner mechanisms 30 to any number of heads 16. For the purposes of this disclosure, head(s) 16, tension mechanism (s) 30, sensor(s) 38 (if included), feeder(s) 40, and mounting bracket 50 may together be considered a head assembly that is removably connectable to the distal tip of support 14. It is contemplated that multiple head assemblies may be simultaneously and/or interchangeably connectable to the distal tip of support 14, if desired.

One or more encoders (not shown) could be associated with one or both of guide elements 32 shown in FIG. 5, and used to track a speed of guide elements 32 and/or an associated speed of the reinforcements R passing over guide elements 32. Based on this speed information (e.g., the speed of the guide element 32 closest to head 16), the upstream guide element 32 and/or feeder 40 could be driven at a corresponding speed. In other words, a measured downstream consumption speed would dictate the upstream feed speed, such that such at least some length of reinforcements R is always available for use (e.g., a length up to about twice the distance between guide elements 32) by head 16.

INDUSTRIAL APPLICABILITY

The disclosed systems may be used to continuously manufacture composite structures having any desired cross-sectional size, shape, length, density, and/or strength. The composite structures may include any number of different reinforcements of the same or different types, diameters, shapes, configurations, and consists, each coated with a common matrix material. In addition, the disclosed tension mechanisms, heads, and head assembly may allow for consistent and/or desired levels of tension within the cured reinforcements, resulting in a higher performing composite structure being produced without manufacturing interruptions. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, density stipulations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

Installation of the reinforcements may be performed by passing the reinforcements down through matrix reservoir 28 and tension mechanism 30, and then threading the reinforcements through nozzle 26. Installation of the matrix material may include filling head 16 and/or coupling of an extruder (not shown) to head 16.

Head 16 may then be moved by support 14 under the regulation of controller 22 to cause matrix-coated reinforcements to be placed against or on a corresponding anchor point 18. Cure enhancers 20 may then be selectively activated to cause hardening of the matrix material surrounding the reinforcements, thereby bonding the reinforcements to anchor point 18.

The component information may then be used to control operation of systems 10 and 12. For example, the reinforcements may be pulled and/or pushed from head 16 (along with the matrix material), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass through tension mechanism 30, which may help to maintain a desired level of tension within the reinforcement without causing bunching of the reinforcement within matrix reservoir 28. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A head assembly for an additive manufacturing system, comprising:

a mounting bracket having a first end connectable to a moveable support, and a second end;

a matrix reservoir connected to the second end of the mounting bracket and configured to wet a continuous reinforcement with a liquid matrix;

a nozzle connected to receive the matrix-wetted continuous reinforcement from the matrix reservoir; and a tension mechanism located upstream of the nozzle and movable throughout pulling of the continuous reinforcement out of the additive manufacturing system to maintain a desired level of tension greater than zero in an axial direction of the continuous reinforcement.

2. The head assembly of claim 1, wherein the tension mechanism is located at least partially inside the matrix reservoir.

3. The head assembly of claim 1, further including at least one matrix jet located downstream of the tension mechanism and configured to push the continuous reinforcement towards the nozzle with a liquid matrix passing from the matrix reservoir through the matrix jet.

4. The head assembly of claim 1, wherein the tension mechanism includes:
a first guide element;
a second guide element spaced apart from the first guide element and configured to receive the continuous reinforcement in a straight-line trajectory from the first guide element; and
a dancer located between the first and second guide elements and configured to bias the continuous reinforcement away from the straight-line trajectory a distance related to the tension within the continuous reinforcement.

5. The head assembly of claim 4, wherein at least one of the first and second guide elements is a roller having a concave outer profile configured to axially spread out the continuous reinforcement.

6. The head assembly of claim 4, wherein the dancer is biased by gravity.

7. The head assembly of claim 4, wherein the dancer is movable based on an amount of available continuous reinforcement.

8. The head assembly of claim 4, wherein the dancer maintains a generally constant tension level within the continuous reinforcement.

9. The head assembly of claim 4, further including at least one sensor associated with the dancer and configured to generate a signal indicative of a required adjustment in feed rate of the continuous reinforcement.

10. The head assembly of claim 1, further including a cure enhancer located adjacent the nozzle and configured to cure the matrix wetting the continuous reinforcement during discharge from the nozzle.

11. The head assembly of claim 9, further including a reinforcement feeder connected to the mounting bracket at a location upstream of the tension mechanism, the reinforcement feeder being configured to feed the continuous reinforcement through the tension mechanism to the nozzle.

12. The head assembly of claim 11, further including a controller in communication with the at least one sensor and the reinforcement feeder, the controller being configured to selectively activate the reinforcement feeder based on the signal.

13. The head assembly of claim 11, further including a second reinforcement feeder connected to the mounting bracket, the second reinforcement feeder being configured to feed a second continuous reinforcement through the tension mechanism to the nozzle.

14. The head assembly of claim 9, wherein:
the at least one sensor includes:
a first limit sensor associated with a maximum allowable tension; and
a second limit sensor associated with a minimum allowable tension; and
the dancer is moveable between the first and second limit sensors.

15. The head assembly of claim 10, wherein the cure enhancer includes a UV light source.

16. The head assembly of claim 3, further including:
at least one sensor configured to generate a signal indicative of a required adjustment in feed rate of the continuous reinforcement; and
a valve associated with the matrix jet and adjustable to maintain a desired ratio of matrix-to-reinforcement based on the signal.

17. The head assembly of claim 1, wherein the tension mechanism is connected to the mounting bracket between the first end and the matrix reservoir.

18. A head assembly for an additive manufacturing system, comprising:
a mounting bracket having a first end connectable to a moveable support, and a second end;
a matrix reservoir connected to the second end of the mounting bracket and configured to wet a continuous reinforcement with a liquid matrix;
a nozzle connected to receive the matrix-wetted continuous reinforcement from the matrix reservoir;
a first guide element;
a second guide element spaced apart from the first guide element and configured to receive the continuous reinforcement in a straight-line trajectory from the first guide element;
a dancer located between the first and second guide elements and configured to bias the continuous reinforcement away from the straight-line trajectory based on a level of tension in the continuous reinforcement that is greater than zero in an axial direction;
at least one sensor associated with the dancer and configured to generate a signal indicative of movement of the dancer; and
a controller in communication with the at least one sensor and configured to selectively adjust a feed rate of the continuous reinforcement based on the signal to raise or lower the level of tension.

19. The head assembly of claim 18, further including a reinforcement feeder connected to the mounting bracket at a location upstream of the dancer, the reinforcement feeder being configured to feed the continuous reinforcement through the dancer to the nozzle.

20. The head assembly of claim 18, further including a light source mounted adjacent the nozzle and configured to expose the liquid matrix wetting the continuous reinforcement to light at discharge from the nozzle.

* * * * *